No. 867,756. PATENTED OCT. 8, 1907.
J. W. ROCK.
ELASTIC TIRE.
APPLICATION FILED AUG. 13, 1906.
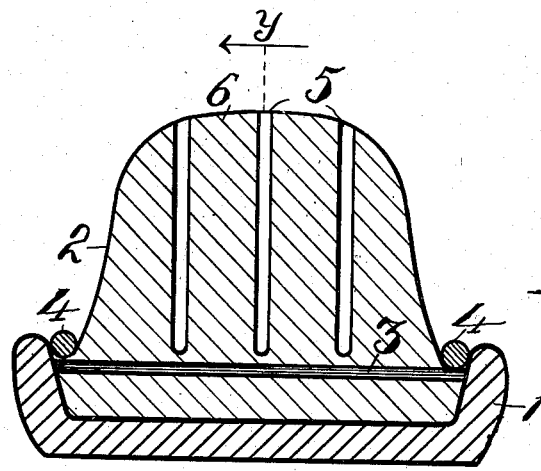
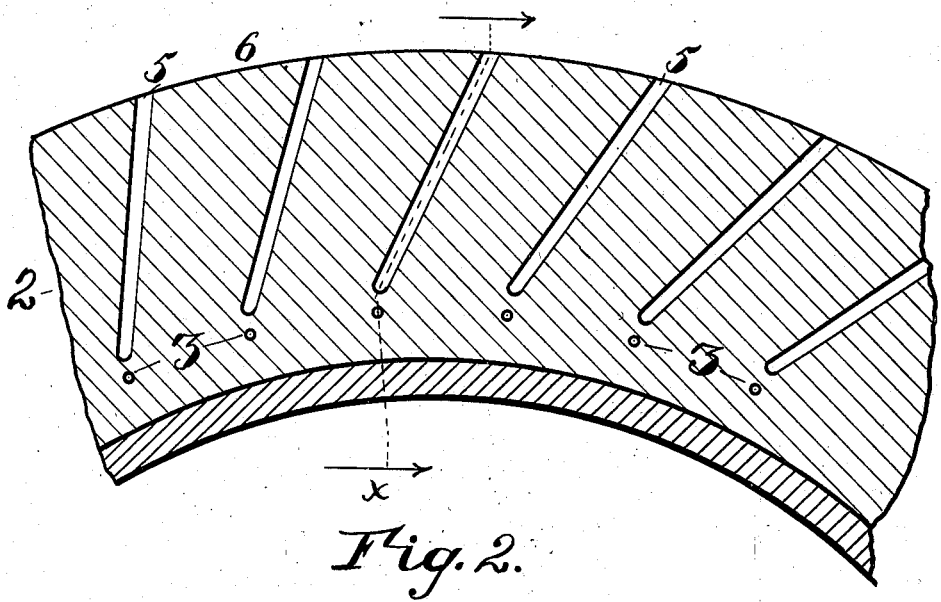

UNITED STATES PATENT OFFICE.

JACOB W. ROCK, OF AKRON, OHIO.

ELASTIC TIRE.

No. 867,756.     Specification of Letters Patent.     Patented Oct. 8, 1907.

Application filed August 13, 1906. Serial No. 330,352.

*To all whom it may concern:*

Be it known that I, JACOB W. ROCK, a citizen of the United States, residing at Akron, in the county of Summit and State of Ohio, have invented new and useful Improvements in Elastic Tires, of which the following is a specification.

This invention relates to improvements in elastic tires for vehicles and the object thereof is to increase the resiliency of the tires and decrease the amount of material employed in their construction.

With the foregoing and other objects in view, the invention consists in the novel construction, combination and arrangement of parts constituting the invention to be hereinafter referred to and illustrated in the accompanying drawings which form a part of this specification in which is shown the preferred embodiment of the invention, but it is to be understood that changes, variations and modifications can be resorted to which come within the scope of the claims hereunto appended.
In the drawings, in which similar reference numerals indicate like parts in the different figures: Figure 1 is a cross-sectional view at the line $x$ of Fig. 2, showing a side wire tire embodying my invention mounted in a flanged rim; and, Fig. 2 is a section of Fig. 1 at the line $y$.
This invention is adapted to a solid elastic tire used on vehicle wheels, and while I have shown in the drawings the invention as applied to a specific form of tire, I do not wish to confine myself to this particular type of tire.
Broadly speaking, this invention consists in molding in the tread portion of a solid elastic tire a plurality of openings extending from the tread portion thereof inwardly towards the base of the tire. These openings are arranged to terminate at a desirable distance from the base portion of the tire and are preferably formed at a selected angle to the radii of the wheel.

In the drawings is shown an ordinary flanged rim 1, within which is mounted a solid rubber tire 2, through which extend at intervals a series of cross wires 3, located near the base portion of the tire, on the outer exposed ends of which are placed contractible, circumferential retaining wires or bands 4 by which the tire is retained in position in the channel 1. In manufacturing this tire 2, I form by means of a specially constructed mold a plurality of inwardly-directed openings 5 extending from the tread portion 6 of the tire to a point adjacent the cross wires or bars 3. It is however, entirely within the scope of the invention to extend these openings further towards the base of the tire, or to shorten the depth thereof, as the fancies or desires of the user of the device may deem best.

It will be noted that the openings 5 in the drawings are placed at an angle of approximately 30° to the radii of the wheel, and this inclination may be varied to any extent within reasonable limits without departing in any manner from the scope of this invention. It is also entirely within the scope of this invention to form these openings absolutely radial to the wheel and to employ them in any type of tire in which a solid body of elastic material constitutes the resilient portion thereof. These openings 5 may be arranged in parallel, transverse or longitudinal rows, or they may be set at such points that the openings in one row will alternate in position with respect to the position of corresponding openings in other rows, these changes in the placement of the openings being optional with the maker of the tire, the invention consisting broadly in forming in the body portion of the elastic tire a plurality of inwardly-extending openings. It will be noted that by forming these openings in the tire, the amount of material necessarily employed is greatly lessened, thereby reducing the cost of manufacture; and as these openings render the tire to a certain extent cellular, they decrease the firmness thereof and also increase the resiliency of the device in a somewhat similar manner to the increase of resiliency in rubber, by forming the same with a multiplicity of air cells. In forming these openings 5, I prefer to incline them at an angle to the radii of the wheel, so that when the tire is being used and compression exerted thereon, the outer ends of the openings will be closed by the compression due to the weight on the tread, thus preventing the entrance into these openings of such substances as dirt, stones, etc. In forming these openings radial to the wheel-center, there is always a liability of stones and other foreign substances being driven into the openings 5, thus injuring the tire and decreasing its efficiency, both of which defects are overcome by forming these openings at an angle as shown in the drawings, wherein the compression due to a load on the tire will effectually close the openings.

What I claim and desire to secure by Letters Patent, is:—

1. An elastic vehicle tire provided with a plurality of holes, said holes extending from the tread portion thereof inwardly and arranged at an angle to the radii of the wheel on which said tire is mounted.

2. An elastic tire provided with holes in the body portion thereof extending from the tread inwardly and at an angle to the radii of the wheel on which said tire is mounted.

3. An elastic cellular tire adapted to be mounted on a vehicle wheel the cells of which extend from the tread of the tire inwardly and at an angle to the radii of the wheel.

4. An elastic tire provided with a plurality of holes in the body portion thereof extending from the tread thereof inwardly, the axis of each of said holes being at an angle to the radius of the wheel on which said tire is mounted.

In testimony whereof I have hereunto set my hand in presence of two subscribing witnesses.

JACOB W. ROCK.

Witnesses.
C. E. HUMPHREY,
GLENARA FOX.